United States Patent [19]

Krueger

[11] Patent Number: 5,031,294
[45] Date of Patent: Jul. 16, 1991

[54] STRUT SPRING COMPRESSOR

[75] Inventor: Harold Krueger, Barnsville, Minn.

[73] Assignee: Branick Industries, Inc., Fargo, N. Dak.

[21] Appl. No.: 518,111

[22] Filed: May 3, 1990

[51] Int. Cl.$^5$ .............................................. B23P 19/04
[52] U.S. Cl. .................................... 29/227; 254/10.5
[58] Field of Search ................................ 29/215–218, 29/225, 227; 254/10.5

[56] References Cited

U.S. PATENT DOCUMENTS

| | | | |
|---|---|---|---|
| 3,067,500 | 12/1962 | Bliss | 29/227 |
| 3,384,348 | 5/1968 | Wicker | 254/10.5 |
| 4,034,960 | 7/1977 | Kloster | 254/10.5 |
| 4,219,918 | 9/1980 | Klann | 29/227 |
| 4,785,519 | 11/1988 | Krueger. | |
| 4,872,644 | 10/1989 | Papapetros | 254/10.5 |
| 4,872,645 | 10/1989 | Dossier | 29/227 |

Primary Examiner—Robert C. Watson
Attorney, Agent, or Firm—Merchant, Gould, Smith, Edell, Welter & Schmidt

[57] ABSTRACT

An apparatus is disclosed for use in assembly and disassembly of the strut assembly having a shock absorber disposed within a coil spring. The apparatus includes a frame and a first spring engagement member secured to the frame for engaging the first end of the spring of a strut. A second spring engagement member is provided connected to the frame for movement with the frame toward and away from the first spring engagement member.

7 Claims, 6 Drawing Sheets

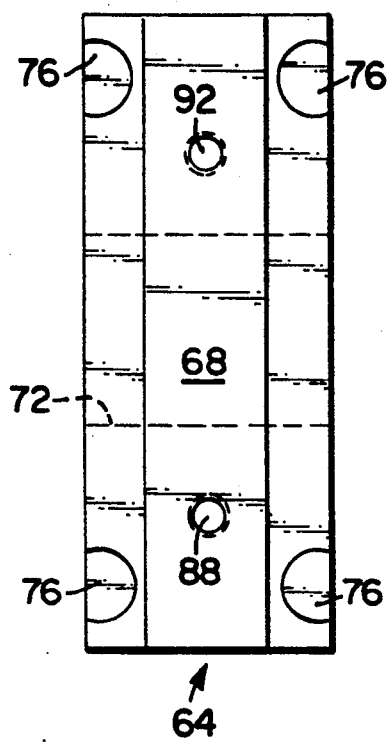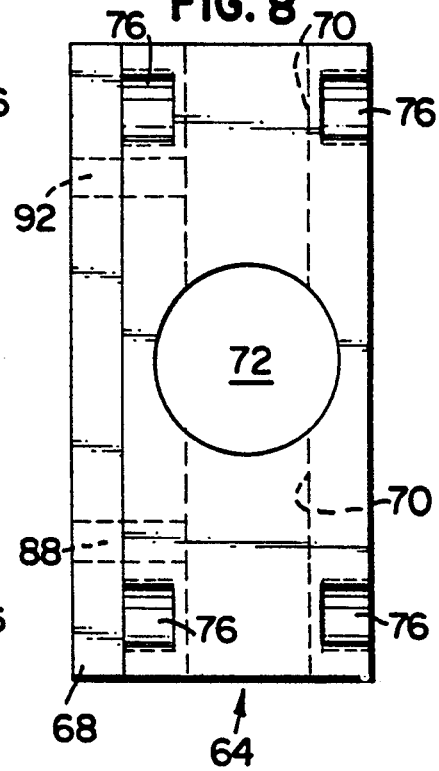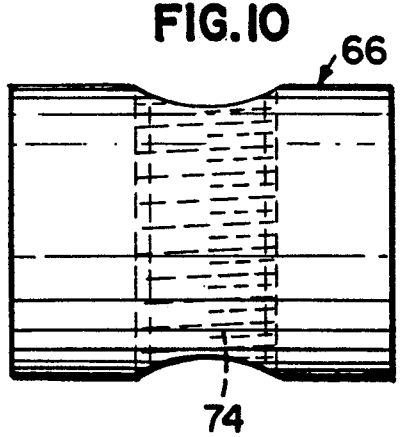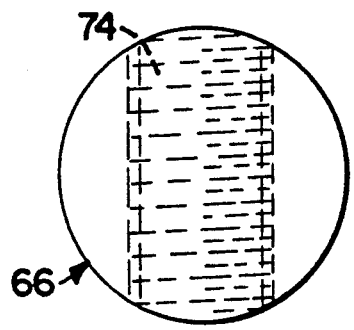

STRUT SPRING COMPRESSOR

BACKGROUND OF THE INVENTION

1. Field of the Invention

This invention relates to an apparatus for use in assembly and disassembly of a strut of the type having a shock absorber disposed within a coil spring.

2. Description of the Prior Art

Common automobile suspension systems, such as the well known MacPherson-type, include a strut assembly having a shock absorber and a spring. The strut assembly is pre-assembled and mounted as a unit in the vehicle body. During maintenance of an automobile, it is not uncommon to assemble and disassemble a strut assembly.

During assembly and disassembly of MacPherson-type strut assembly, the coil spring is compressed and retained in a compressed state. Numerous apparatus have been developed to assist in the assembly and disassembly of a strut suspension system. Examples of these would be found in U.S. Pat. Nos. 4,558,500; 4,520,453, 4,516,303, and 4,494,289. In addition, commonly assigned U.S. Pat. No. 4,785,519 dated Nov. 22, 1988 teaches a strut spring compressor. In the aforesaid U.S. Pat. No. 4,785,519, a compression head is mounted on a frame with the compression head having linkages permitting compression elements to move relative to one another and assume unaligned positions as the spring is being compressed.

SUMMARY OF THE INVENTION

According to the preferred embodiment of the present invention, an apparatus is disclosed for use in the assembly and disassembly of a strut having a shock absorber disposed within a coil spring. The apparatus includes a frame and a first spring engagement member for engaging a first end of the spring. A first connecting member is provided connecting the first spring engagement member to the frame in a fixed location. A second spring engagement member is provided for engaging a second end of the spring. A second connecting member is provided for connecting the second spring engaging member to the frame with the second spring engagement member movable on the frame toward and away from the first spring engagement member. The second connecting member includes a threaded shaft connected to the frame and rotatable about a shaft axis. A carriage is connected to the shaft for advancing along the length of the shaft in response to rotation of the shaft. The carriage includes a carriage body and a carriage plug. The plug is slidably received on the shaft and pivotably received within the carriage body.

BRIEF DESCRIPTION OF THE DRAWINGS

FIG. 8 is a side elevation view of a carriage body for use with the present invention;

FIG. 9 is a rear elevation view of the carriage body of FIG. 8;

FIG. 10 is a front elevation view of a carriage plug for use with the present invention; and FIG. 11 is a side elevation view of the plug in FIG. 10.

DESCRIPTION OF THE PREFERRED EMBODIMENT

Figure 1:
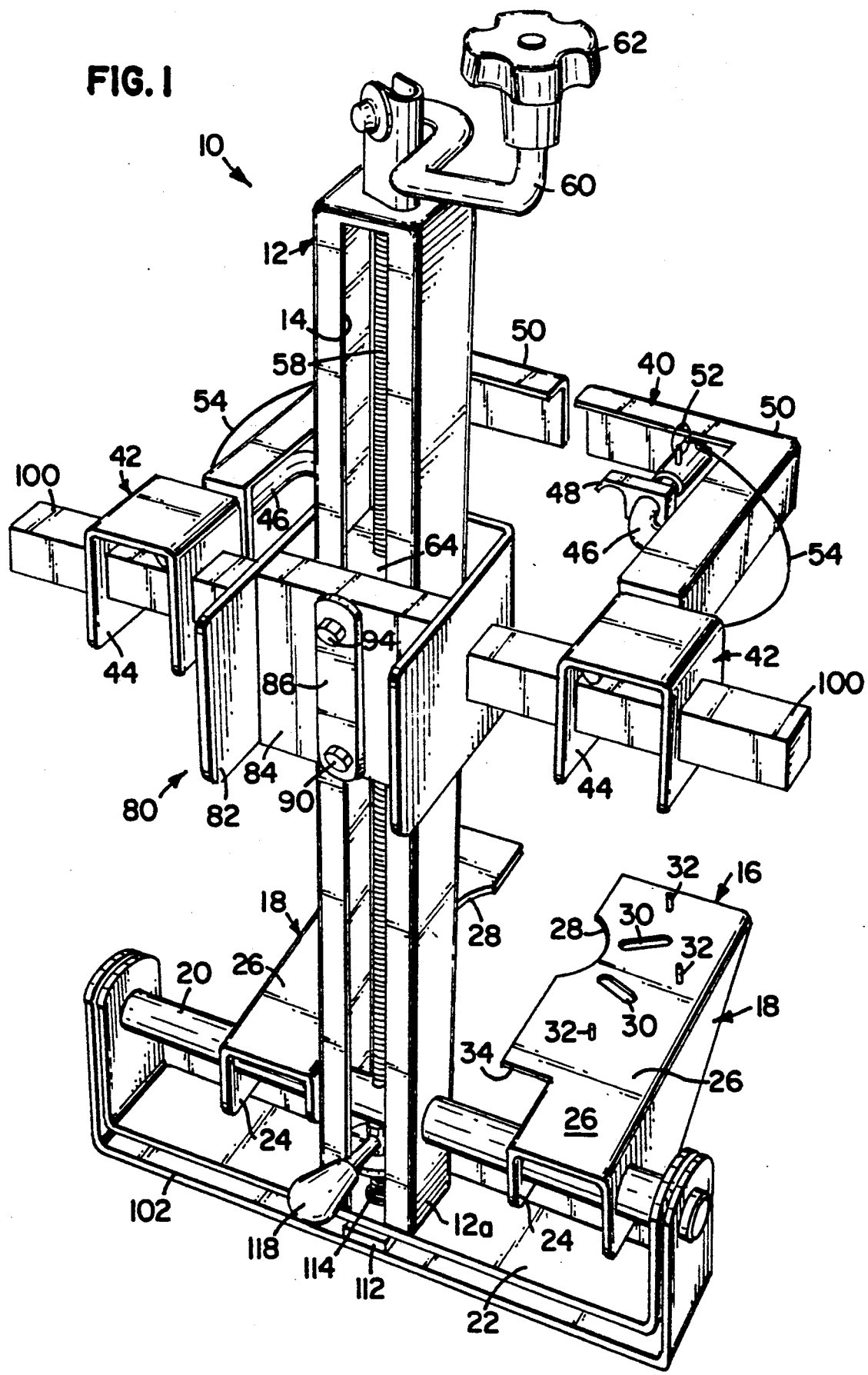
FIG. 1 is a perspective view of an apparatus of the present invention.

Referring now to the several drawing figures in which identical elements are numbered identically throughout, the present invention will now be described with reference to a preferred embodiment.

The apparatus of the present invention is shown generally at 10. The apparatus 10 includes a frame 12. Frame 12 which is a hollow tube which is square in cross-section and which has a slot 14 extending through a back of the frame 12 to expose the frame interior.

A first spring engagement member 16 is provided in the form of left and right slide plates 18. Slide plates 18 are mirror images of one another and accordingly similarly numbered.

Each of slide plates 18 are mounted on a pivot tube 20 which extends through the bottom of the frame 12. Ends of the tube 20 are joined by U-shaped slide plate support 22 which is fixed to the bottom 12a (see FIG. 1) of frame 12.

Each of the slide plates 18 include U-shaped channels 24 (FIG. 1) through which pivot tube 20 passes. The U-shaped channels 24 carry flat mounting plates 26 against which a first end of a spring is to be secured as will be described. Opposing surfaces of opposing mounting plates 26 are provided with semi-circular indents 28 and radiantly projecting slots 30 as well as projecting pins 32. The slots 30, pins 22 and semi-circular indents 28 are used to secure the slide plate 18 to the first end of the spring as will be described.

Slots 30 are disposed to receive mounting bolts of a strut assembly. Pins 32 are positioned to surround an upper spring seat (e.g. seat 205 in FIG. 2) of a strut. The slots and pins 32 help prevent a strut from slipping off of the apparatus 10. Accordingly, with the present design, special adaptors are not necessary.

Figure 2:
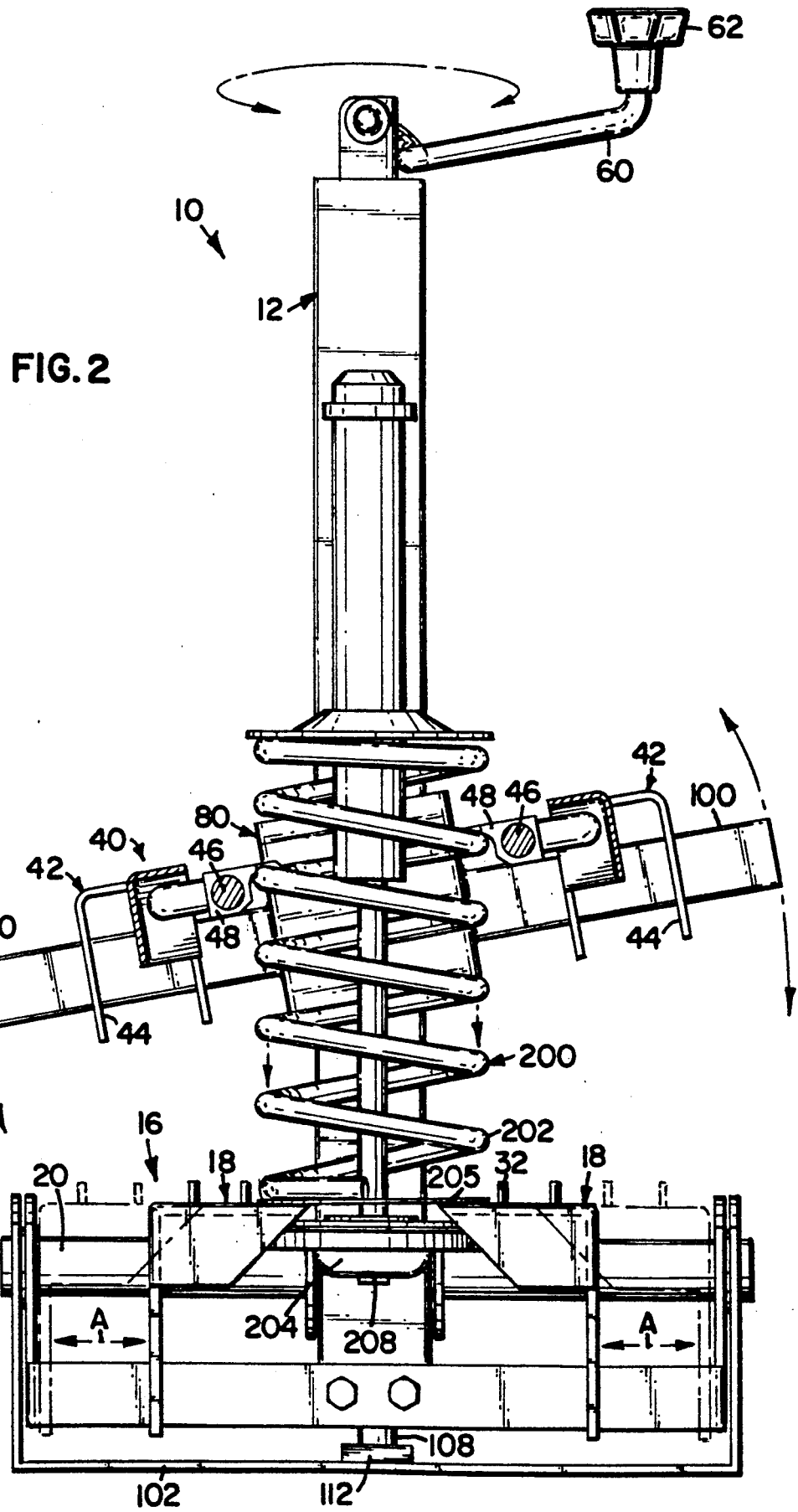
FIG. 2 is a front elevation view of the apparatus of the present invention shown in use with a strut.

As shown best in FIG. 2, the slide plates 18 may slide along the pivot tube 20 in the direction of arrows A. Each of the side plates 18 includes a ledge 34 (see FIG. 1). With the plates 18 moved toward the frame 12, the ledge 34 abuts frame 12 and prevents the slide plates 28 from being pivoted about tube 20. When the slide plates 18 are moved away from the frame 12 the ledge 34 is cleared from frame 18 and a slide plate 18 may be pivoted to be in a common plane with frame 12. This pivoting feature permits the frame to be collapsed.

A second spring engagement member 40 is provided for engaging the second end of the spring of a strut assembly. The second spring engagement 40 includes left and right compression arms 42. Each of compression arms 42 are mirror images of one another and a description of one will suffice as the description of the other.

Compression arms 42 include U-shaped attachment brackets 44. Steel rods 46 are secured to the attachment brackets 44. Spring engagement hooks 48 are secured to the rods 46 in a fixed position with the hooks 48 selected to engage the second end of a helical spring (see FIG. 2).

Figure 4:
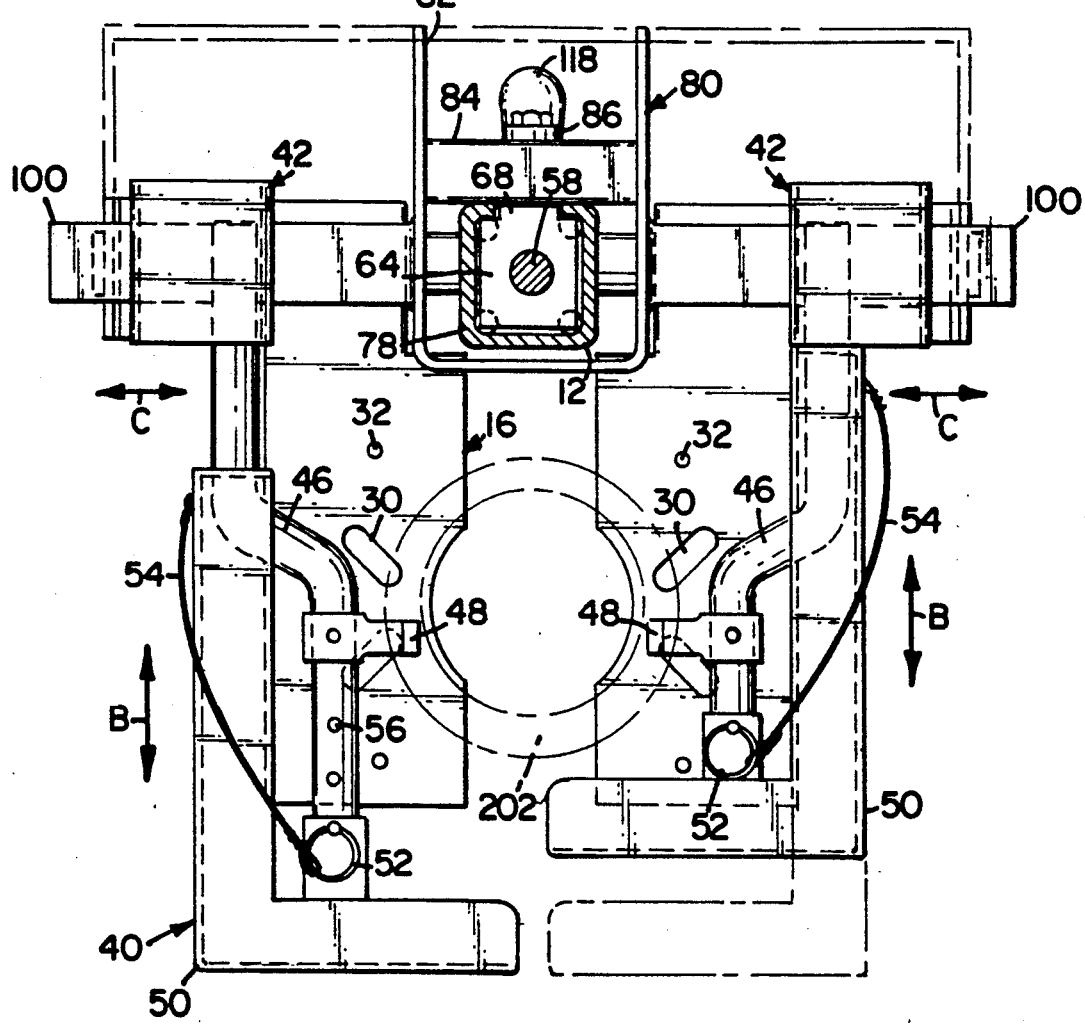
FIG. 4 is a view taken along lines 4—4 of FIG. 3.

L-shaped guards 50 are slidably carried on each of rods 46 and slidable in the direction of arrows B in FIG. 4.

Pins 52 connected to the guards 50 by cables 54 secure the guards 50 in any one of a plurality of desired fixed positions by being received within holes 56 formed in the distal ends of rods 46.

To permit second spring engagement member 40 to move along the frame toward or away from the first spring engagement member 16, a novel connection mechanism is provided for connecting the second spring engagement member 40 to the frame 12.

A threaded shaft 58 is contained within the interior of frame 12 and is connected to an exterior handle 60 having a crank knob 62. Accordingly, an operator may engage knob 62 and turn handle 60 causing shaft 58 to rotate about its shaft axis.

Figure 7:
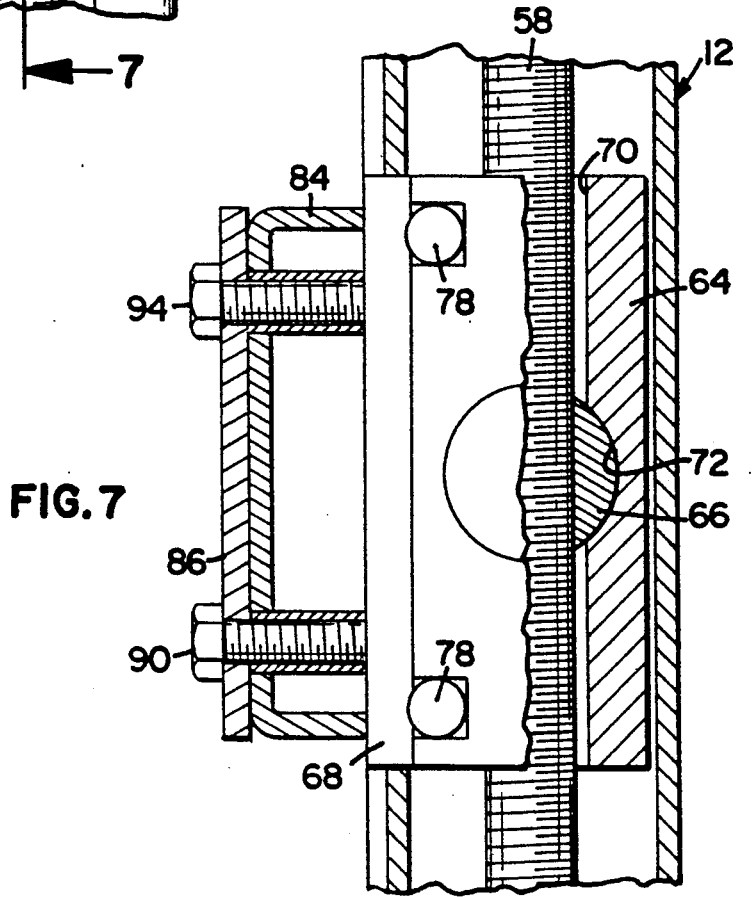
FIG. 7 is a view, partially in section, showing a carriage carried on a threaded shaft of the present invention.

A carriage in the form of a carriage body 64 and cooperating carriage plug 66 are shown best in FIGS. 7, 8 and 9. The carriage body is a generally rectangular shaped block which is square in cross section, it has a protruding rail 68 on one face. Extending through the length of the block is a bore 70 sized to freely receive the threaded shaft 58. Also extending through body 64 but perpendicular to bore 70 is a second bore 72. As shown in FIGS. 7, 10 and 11, the plug 66 is cylindrical and sized to be received within bore 72 to rotate about the cylindrical axis of plug 66 which is perpendicular to the axis of shaft 58. The plug 66 has a threaded bore 74 sized to threadably engage the threaded shaft 58.

The body 64 is sized to be complementary received within the interior of frame 12. Eight detents 76 (a representative four of which are shown in FIG. 9) are formed in each corner of the body 64 and are sized to receive a steel bearing 78 (see FIG. 4) to provide reduced friction as the carriage body 64 moves within frame 12.

With the structure thus described, as the threaded shaft 58 turns, the shaft 58 urges the plug 68 to move up or down within the frame 12. Movement of the plug 66 is translated into movement of the carriage body 64. The relative rotational movement between the plug 66 and the body 64 prevents binding so that the shaft 58 may be freely turned.

Figure 6:
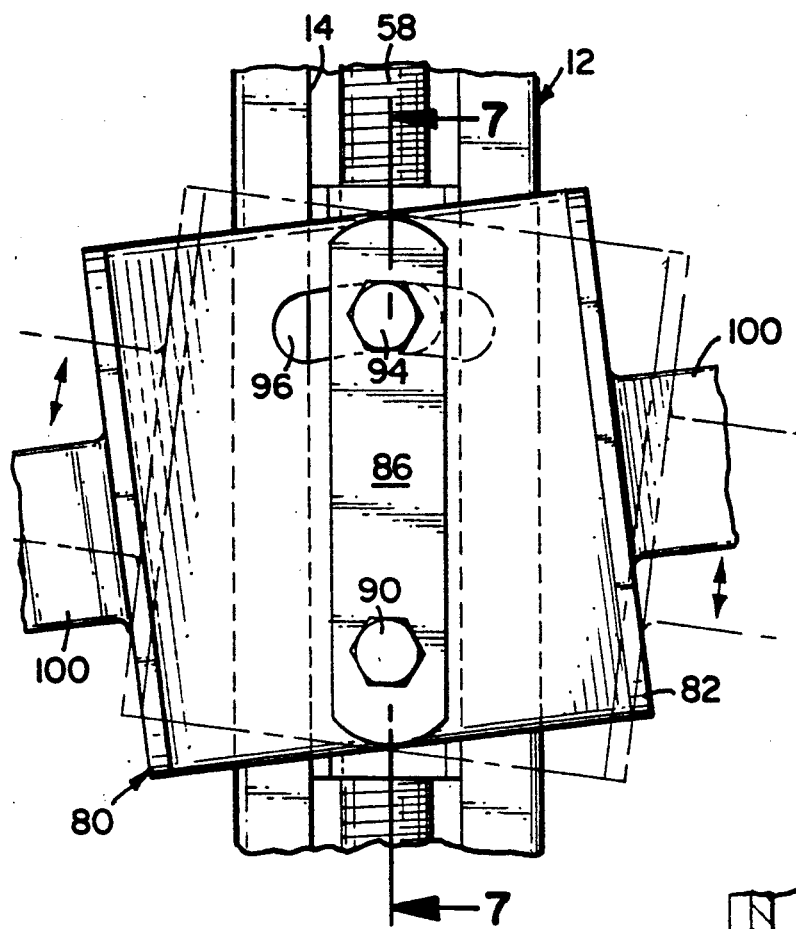
FIG. 6 is a view showing a floating compression head for use with the present invention.

A compression head 80 is provided for connecting the second spring engagement member 40 to the carriage body 64. The compression head 80 includes a U-shaped brace 82 which surrounds frame 12 with the brace 82 being spanned by a connecting plate 84. A link 86 is provided having a first end connected a first threaded hole 88 of rail 68 by a bolt 90. A second end of the link 86 is connected to an upper threaded hole 92 by a bolt 94. Connecting plate 84 has an accurate elongated slot 96 through which bolt 94 passes. As a result of the arcuate elongate slot 96, the compression head may pivot about bolt 90 as best shown in FIG. 6. In FIG. 6 a pivotal position is shown in phantom lines. Also, shown in FIG. 6, brace 82 limits the amount of pivot of the head 80.

Support arms 100 extend from opposite sides of the U-shaped brace 82 (see FIGS. 1 and 4). The compression arms attachment brackets 44 are slidably received on support arms 100. As a result, the compression arms 42 may be moved toward and away from one another (in the direction of arrows C in FIG. 4) but are restricted from pivotable movement due to the square cross-sectional shape of the support arms 100.

Figure 3:
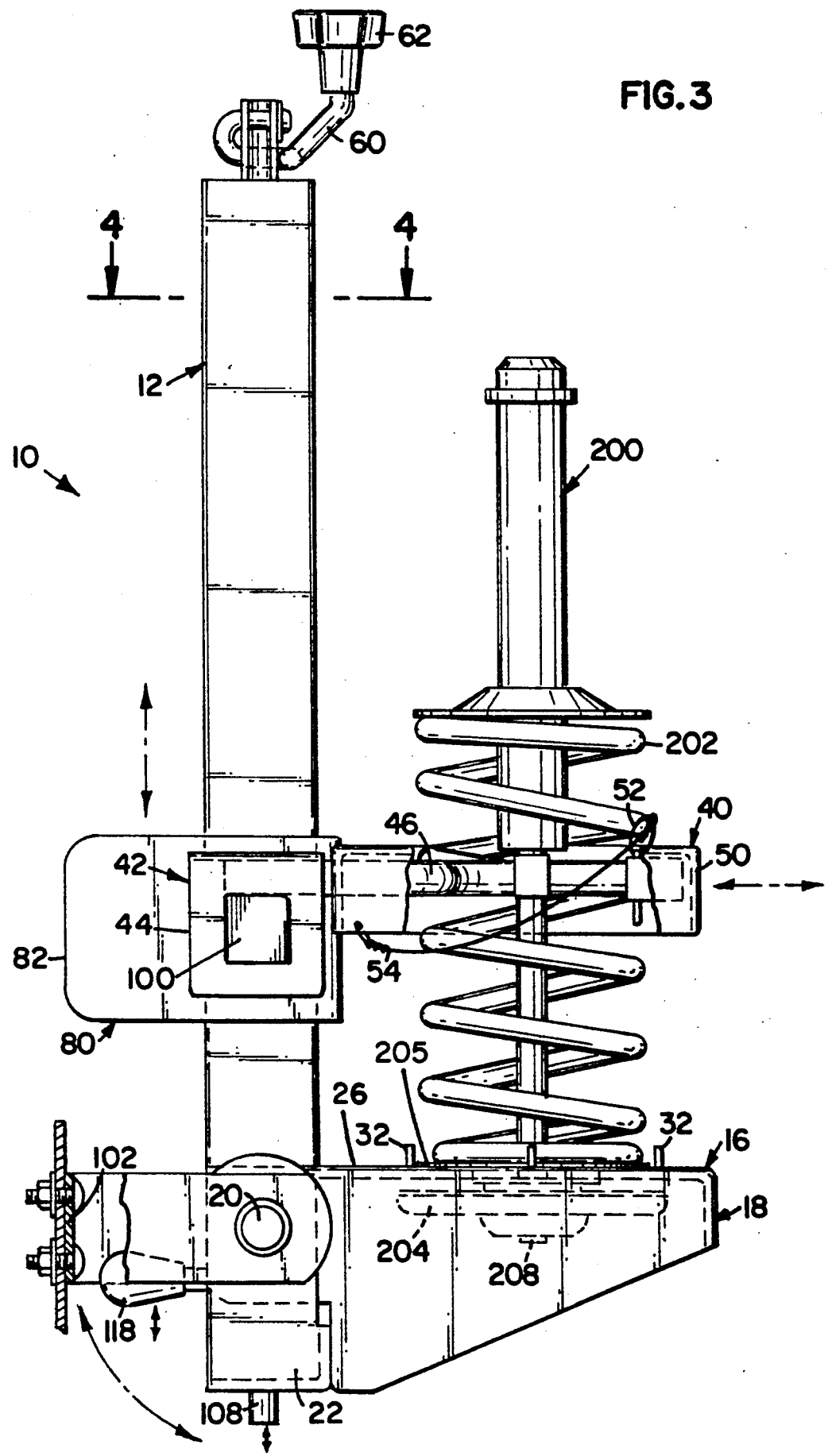
FIG. 3 is a side elevation view of the apparatus of FIG. 2.

FIG. 1 shows the frame in an upright position. The frame includes a base 102 which is U-shaped and pivotably mounted to the pivot tube 20. The base may be connected to any support such as a work table or the like. The frame 12 may be pivoted relative to the base 102 from the upright position shown in FIG. 1 to a pivoted position shown in FIG. 3.

Figure 5:
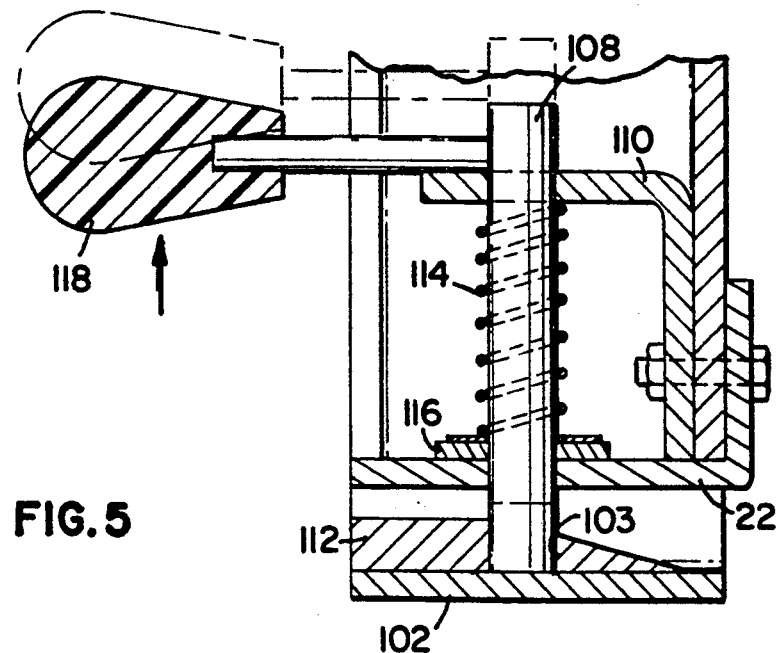
FIG. 5 is a view, taken in section, of a release mechanism for use with the present invention.

A release mechanism 106 is shown in FIG. 5. The release mechanism 106 includes a lock pin 108 which is slidably received through a pin holder 110 and passes through slide plate support 22 and into a hole 103 in a pin receiving base 112.

With pin 108 received within hole 103 the frame is locked in the upright position of FIG. 1. A spring 114 opposing a washer 116 secured to pin 108 urges pin 108 to the position received within hole 103. A handle 118 is secured to the pin 108 so that an operator can move the pin 108 against the urging of spring 104 to release it from hole 103 and permit the frame 12 to be pivoted relative to the mounting bracket or base 102.

In operation, an operator places a strut 200 within the apparatus as shown in FIG. 2. The plates 18 are placed between a strut spring 202 and a strut upper spring plate 204. (The radial slots 30 permit the apparatus to be used when the strut does not have a separate upper spring seat. Instead, the mounting studs of the strut may be received within the slots 30.)

With the strut captured as shown in FIG. 2, the operator can turn the handle to cause the compression head 80 to move downwardly. As the compression head 80 moves downwardly, the pivotable action of the compression head 80 on the rail 68 permits the hooks to align with the complex helical spring 202 as shown in FIG. 2. The frame is tilted to the position shown in FIG. 3 so that an operator can remove a nut 208 from the bottom of the strut assembly 200 with the operator being positioned away from the compressed spring 202.

During shipment, the compression arms 42 can be removed and oriented 90° so that they are in the plane of the frame 12 and the slide plates 18 can be pivoted to a position with the slide plates 18 in the plane of the frame 12. As a result, the tool is folded-up for easy storage to minimize shipping costs.

Having disclosed the preferred embodiment of the present invention, it can be seen how the objects of the invention have been obtained in a preferred manner. However, modifications and equivalents of the disclosed contents are intended to be included within the scope of the claims appended hereto.

What is claimed is:

1. An apparatus for use in the assembly and disassembly of a strut of the type having a shock absorber disposed within a coil spring, said apparatus comprising:
 a frame;
 first spring engagement means for engaging a first end of a strut spring;
 first connecting means for connecting said first spring engagement means to said frame in a fixed location on said frame;
 second spring engagement means for engaging a second end of said strut spring;
 second connecting means for connecting said second spring engagement means to said frame with said second spring engagement means movable on said frame toward and away from said first spring engagement means, said second connecting means including;

a threaded shaft connected to said frame and rotatable about an axis of said shaft;

carriage means connected to said shaft for advancing along the length of said shaft in response to rotation of said shaft, said carriage means including a carriage body and a carriage plug, said second spring engagement means connected to said carriage body for movement therewith, said plug received within said carriage and rotatable therein about an axis of rotation generally perpendicular to said shaft axis, said plug having a threaded bore, said carriage having an enlarged bore extending axially therethrough and generally perpendicular to said axis of rotation, said enlarged bore sized to freely pass said shaft and said enlarged bore disposed to be generally axially aligned with said threaded bore, said shaft extending through said enlarged bore and threadably received within said threaded bore.

2. An apparatus according to claim 1 wherein second spring engagement means includes a compression head connected to said carriage for movement therewith, and at least one spring engagement member connected to said compression head; and pivotal connecting means for connecting said compression head to said carriage with said head pivotable to planes non-parallel to a plane of said first spring engagement means.

3. An apparatus according to claim 2 wherein said pivotable connecting means includes a first pivot pin for connecting said compression head to said carriage and a second pin for limiting an amount of pivotable movement of said compression head relative to said carriage.

4. An apparatus according to claim 1 comprising a base member pivotably secure to said frame with releasable lock means for locking said base to said frame in at least one pre-determined fixed position.

5. An apparatus according to claim 1 wherein said first spring engagement means includes means for collapsing said first spring engagement means to a common plane with said frame.

6. An apparatus for use in assembly and disassembly of a strut of the type having a shock absorber disposed within a coil spring, said apparatus comprising:

a frame;

first spring engagement means for engaging a first end of a strut spring;

first connecting means for connecting said first spring engagement means to said frame in a releasable fixed position on said frame and extending from said frame, said first connecting means including means for releasably pivoting said first spring engagement means about an axis of rotation generally perpendicular to a longitudinal dimension of said frame to a plane in common with said frame;

second spring engagement means for engaging a second end of said strut springs;

second connecting means for removably connecting said second spring engagement means to said frame in a first position with said second spring engagement means movable on said frame toward and away from said first spring engagement means, said second connecting means including means for removably connecting said second spring engagement means to said frame with said second spring engagement means in a common plane with said frame.

7. An apparatus according to claim 6 wherein said second connecting means includes support arm means connected to said frame for movement along a longitudinal axis of said frame toward and away from said first connecting means, said second connecting means and said spring connecting means including cooperating elements selected for said spring engagement means to be slidable along an axis of said second connecting means generally perpendicular to said longitudinal dimension with said spring engagement means restricted from rotational movement about said axis.

* * * * *